(12) United States Patent
Lee et al.

(10) Patent No.: US 10,557,612 B2
(45) Date of Patent: Feb. 11, 2020

(54) LAMP FOR VEHICLE

(71) Applicant: SL Corporation, Daegu (KR)

(72) Inventors: Choon Woo Lee, Daegu (KR); Doo Woon Kang, Daegu (KR)

(73) Assignee: SL Corporation, Daegu (KR)

( * ) Notice: Subject to any disclaimer, the term of this patent is extended or adjusted under 35 U.S.C. 154(b) by 109 days.

(21) Appl. No.: 15/824,402

(22) Filed: Nov. 28, 2017

(65) Prior Publication Data

US 2018/0163941 A1 Jun. 14, 2018

(30) Foreign Application Priority Data

Sep. 28, 2016 (KR) .................. 10-2016-0124935

(51) Int. Cl.
| | | |
|---|---|---|
| *F21S 43/19* | (2018.01) | |
| *B60Q 1/00* | (2006.01) | |
| *F21S 43/14* | (2018.01) | |
| *F21S 43/20* | (2018.01) | |
| *B60Q 1/32* | (2006.01) | |
| *F21S 43/27* | (2018.01) | |
| *F21K 9/69* | (2016.01) | |
| *F21S 41/19* | (2018.01) | |
| *F21V 19/00* | (2006.01) | |

(Continued)

(52) U.S. Cl.
CPC ............ *F21S 43/195* (2018.01); *B60Q 1/007* (2013.01); *B60Q 1/0088* (2013.01); *B60Q 1/32* (2013.01); *F21K 9/69* (2016.08); *F21S 41/148* (2018.01); *F21S 41/192* (2018.01); *F21S 41/194* (2018.01); *F21S 41/198* (2018.01); *F21S 43/14* (2018.01); *F21S 43/26* (2018.01); *F21S 43/27* (2018.01); *F21V 19/001* (2013.01); *F21V 19/0045* (2013.01); *F21K 9/20* (2016.08); *F21S 43/40* (2018.01); *F21W 2102/30* (2018.01); *F21W 2103/15* (2018.01); *F21Y 2115/10* (2016.08)

(58) Field of Classification Search
CPC .......... F21S 43/195; F21S 43/14; F21S 43/27; F21S 43/26; F21S 41/194; F21S 41/198; F21S 41/148; F21S 41/192; F21K 9/69; F21V 19/001; F21V 19/0045; B60Q 1/007; B60Q 1/0088; B60Q 1/32
See application file for complete search history.

(56) References Cited

U.S. PATENT DOCUMENTS

| | | | | |
|---|---|---|---|---|
| 5,526,236 A | * | 6/1996 | Burnes | .................... G09F 13/04 257/E25.028 |
| 2009/0296416 A1 | * | 12/2009 | Luo | .......................... F21K 9/00 362/487 |
| 2017/0059147 A1 | * | 3/2017 | Schmidt | .................. F21V 29/70 |

FOREIGN PATENT DOCUMENTS

| | | |
|---|---|---|
| JP | 2016-051653 A | 4/2016 |
| KR | 20-0231238 Y1 | 7/2001 |

(Continued)

*Primary Examiner* — Matthew J. Peerce
*Assistant Examiner* — Nathaniel J Lee
(74) *Attorney, Agent, or Firm* — Nelson Mullins Riley & Scarborough LLP; Kongsik Kim

(57) ABSTRACT

Provided is a vehicular lamp including a lamp housing, a bracket installed on one side of the lamp housing, and a lamp attachable to and detachable from the bracket to be fastened. Here, the lamp includes a light source module, a guide portion to which the light source module is slidably coupled, and a socket portion installed inside the guide portion and to which the light source module is slidably coupled to establish electrical conduction.

10 Claims, 16 Drawing Sheets

(51) Int. Cl.
*F21S 41/148* (2018.01)
*F21K 9/20* (2016.01)
*F21S 43/40* (2018.01)
*F21Y 115/10* (2016.01)
*F21W 102/30* (2018.01)
*F21W 103/15* (2018.01)

(56) References Cited

FOREIGN PATENT DOCUMENTS

KR 10-1060760 B1 8/2011
KR 2012-0065870 A 6/2012

\* cited by examiner

LAMP FOR VEHICLE

CROSS REFERENCE TO RELATED APPLICATION

This application claims priority to Korean Application No. 10-2016-0124935 filed on Sep. 28, 2016, which is incorporated herein by reference.

TECHNICAL FIELD

The present disclosure relates to a lamp for a vehicle, and more particularly, to a lamp for a vehicle, in which a side marker lamp is detachably mounted in a lamp housing so as to be easily replaced.

BACKGROUND ART

Generally, a vehicle includes various types of lamps having an illumination function for easily recognizing an object disposed proximate to the vehicle at night and a signaling function for informing other vehicles near the vehicle or road users of a driving state of the vehicle.

For example, a headlamp, a fog lamp, and the like generally have the illumination function. A turn signaling lamp, a tail lamp, a brake lamp, a side marker lamp, and the like generally have the signaling function. Installation criteria and specifications for the lamps are regulated by law so that each lamp can adequately perform its function.

These lamps diffuse light outward to provide recognizability to a driver of a vehicle at night as the light is emitted forward by a light source, or perform a function of providing recognizability to drivers of other vehicles or pedestrians by emitting the light at night.

Among the above-mentioned lamps, side marker lamps, which are also referred to as clearance lamps or position lamps, are installed at left and right ends of front and rear sides of a car body and emit light at night and the like so as to provide recognizability to drivers of other vehicles or pedestrians so that a size, a position, and the like of the vehicle can be recognized.

In conventional side marker lamps, a bulb type light source is detachably mounted on a bracket installed on one side of a lamp housing. Recently, need for a lamp with a light emitting diode (LED) as a light source, which has low power consumption and excellent illumination efficiency, has increased. Accordingly, a method of allowing a side marker lamp with an LED as a light source to be interchangeably used by making it attachable and detachable to and from a bracket installed on one side of a lamp housing.

SUMMARY

Aspects of the present disclosure provide a lamp for a vehicle, allowing a light emitting diode (LED) type side marker lamp as well as a bulb type side marker lamp to be interchangeably used by allowing a side marker lamp with an LED as a light source to be detachably mounted on a bracket installed on one side of a lamp housing.

In particular, aspects of the present disclosure provide a lamp for a vehicle, which allows a light source module including an LED light source and a substrate to be simply attachable and detachable via slidable insertion so as to be easily replaced.

It should be noted that objects of the present disclosure are not limited to the above-described objects, and other objects of the present disclosure will be apparent to those skilled in the art from the following descriptions.

Aspects of the present disclosure may provide a vehicular lamp including a lamp housing, a bracket installed on one side of the lamp housing, and a lamp attachable to and detachable from the bracket so as to be capable of being fastened. Here, the lamp may include a light source module, a guide portion to which the light source module is slidably coupled, and a socket portion installed inside the guide portion and to which the light source module is slidably coupled to establish electrical conduction.

The light source module may include a substrate on which a circuit is printed and one or more LED light sources are arranged on at least one surface of the substrate.

Terminals, which come into contact with and are gripped by the socket portion, may be formed on one end of the substrate, and a first holding groove snap-fit-coupled to the socket portion and a second holding groove snap-fit-coupled to the guide portion may be formed on at least one of both sides of the substrate.

The guide portion may include a first guide and a second guide arranged on both sides with a slit therebetween and a body portion connected to the first guide and the second guide as one body. Also, one or more held protrusions formed to protrude to face each other with the slit therebetween and snap-fit-coupled to the second holding grooves of the substrate may be formed on the first guide and the second guide.

The socket portion may include grip pieces which grip the terminals of the substrate and provide a conduction function, connection terminals to which one end of a wire connected to a vehicular battery is connected, and first and second sockets at each of which a held piece snap-fit-coupled to the first holding groove of the substrate is formed.

An opening hole through which light emitted by the LED light source passes may be formed at one surface of at least one of the first guide and the second guide.

A lens for diffusing the light emitted by the LED light source may be disposed in the opening hole.

One or more fastening protrusions may be formed on a circumferential surface of the body portion. Also, an inner circumferential surface of the bracket may include lead grooves for leading the fastening protrusions therein, accommodation grooves for accommodating the fastening protrusions when the fastening protrusions are rotated, and restriction pieces for restricting the fastening protrusions from being separated in an insertion direction while the fastening protrusions are accommodated in the accommodation grooves.

Through holes for exposing the connection terminals of the socket portion to exterior of the lamp may be formed at a circumferential surface of the body portion.

The vehicular lamp may further include an outer lens for allowing light emitted by the light source module to be transmitted outward.

Other details of the present disclosure are included in the following detailed description and the drawings.

According to the exemplary embodiments of the present disclosure, a lamp for a vehicle may provide an effect of interchangeably using an LED type side marker lamp as well as a bulb type side marker lamp by allowing a side marker lamp with an LED as a light source to be detachably mounted on a bracket installed on one side of a lamp housing.

According to the exemplary embodiments of the present disclosure, the lamp for a vehicle may also provide an effect of easy replacement of a light source module by enabling a light source module which includes an LED light source and a substrate to be simply attachable or detachable via slidable insertion of the light source module.

Effects of the present disclosure are not limited to the above description and more various effects are included in the specification.

DETAILED DESCRIPTION

Figure 1:
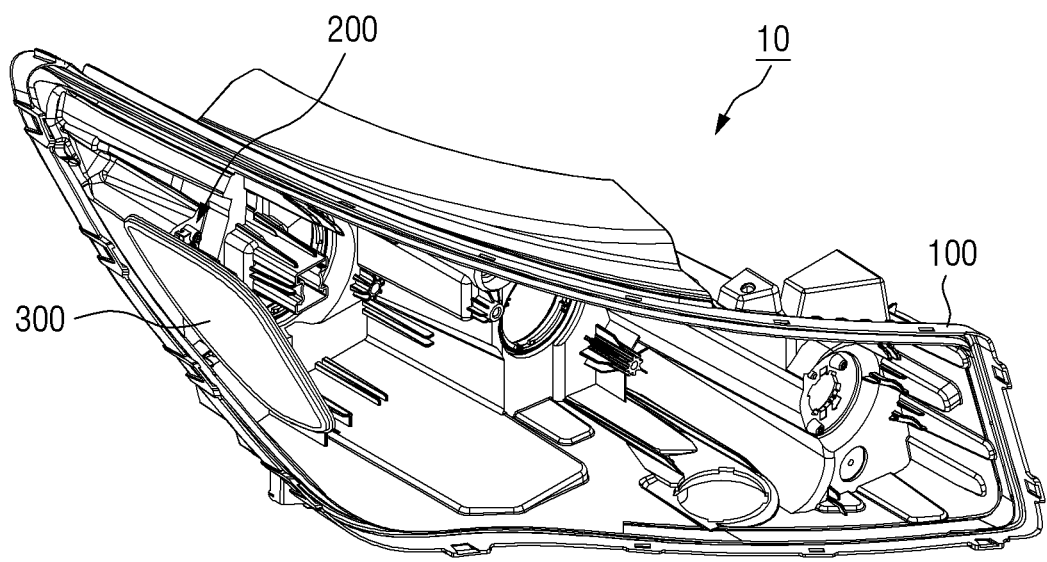
FIG. 1 is a perspective view of a vehicular lamp according to some exemplary embodiments of the present disclosure.

Advantages and features of the present disclosure and a method of achieving the same will become apparent with reference to the accompanying drawings and embodiments described below in detail. However, the present disclosure is not limited to the embodiments described below and may be embodied in various different modifications. The embodiments are merely provided to allow one of ordinary skill in the art to completely understand the scope of the present disclosure, which will be defined by the scope of the claims. Throughout the specification, same reference numerals refer to same elements.

Accordingly, in some embodiments, well-known operations of a process, well-known structures, and well-known technologies will not be described in detail to avoid obscurely understanding the present disclosure.

The terms used herein are for explaining the embodiments but not intended to limit the present disclosure. Throughout the specification, unless particularly defined otherwise, singular forms include plural forms. The terms "comprises" and/or "comprising" are used herein as meanings which do not exclude presence or addition of one or more other components, stages, and/or operations in addition to stated components, stages, and/or operations. Also, "and/or" includes each and one or more combinations of stated items.

Also, embodiments disclosed herein will be described with reference to perspective views, cross-sectional views, side views, and/or schematic diagrams, which are exemplary views of the present disclosure. Accordingly, modifications may be made in the form of exemplary views by a manufacturing technology, an allowable tolerance, and/or the like. Accordingly, the embodiments of the present disclosure will not be limited to particular forms shown in the drawings and include changes in form made according to a manufacturing process. Also, throughout the drawings of the present disclosure, components may be slightly exaggerated or contracted in consideration of convenience of description.

Hereinafter, exemplary embodiments of the present disclosure with respect to a vehicular lamp will be described in detail with reference to the accompanying drawings.

For reference, a side marker lamp will be described as the vehicular lamp according to exemplary embodiments of the present disclosure, but the lamp may be various lamps applied to a vehicle.

Figure 2:
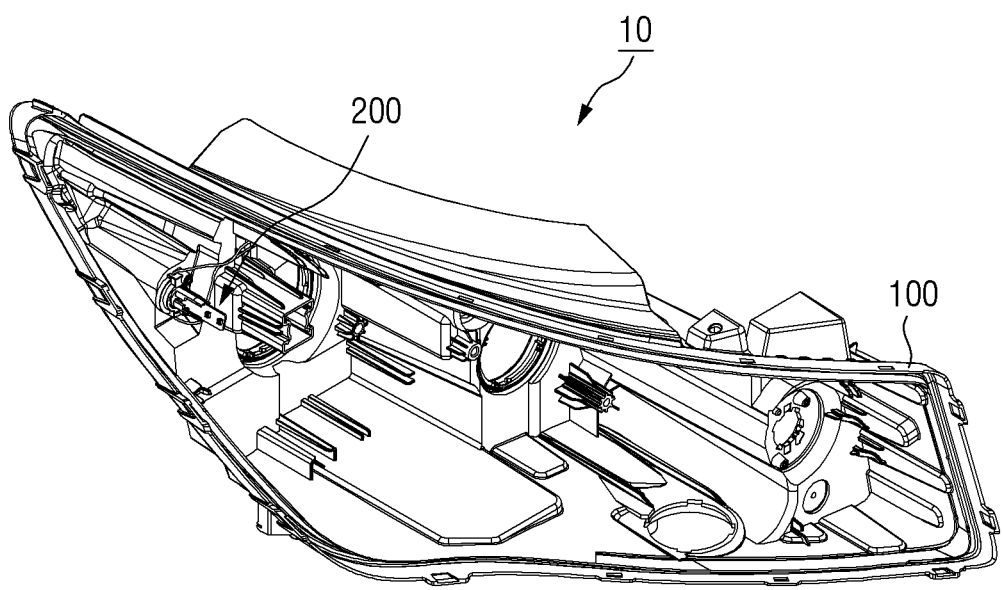
FIG. 2 is a perspective view illustrating a state in which an outer lens of a side marker lamp in FIG. 1 has been removed.
Figure 3:
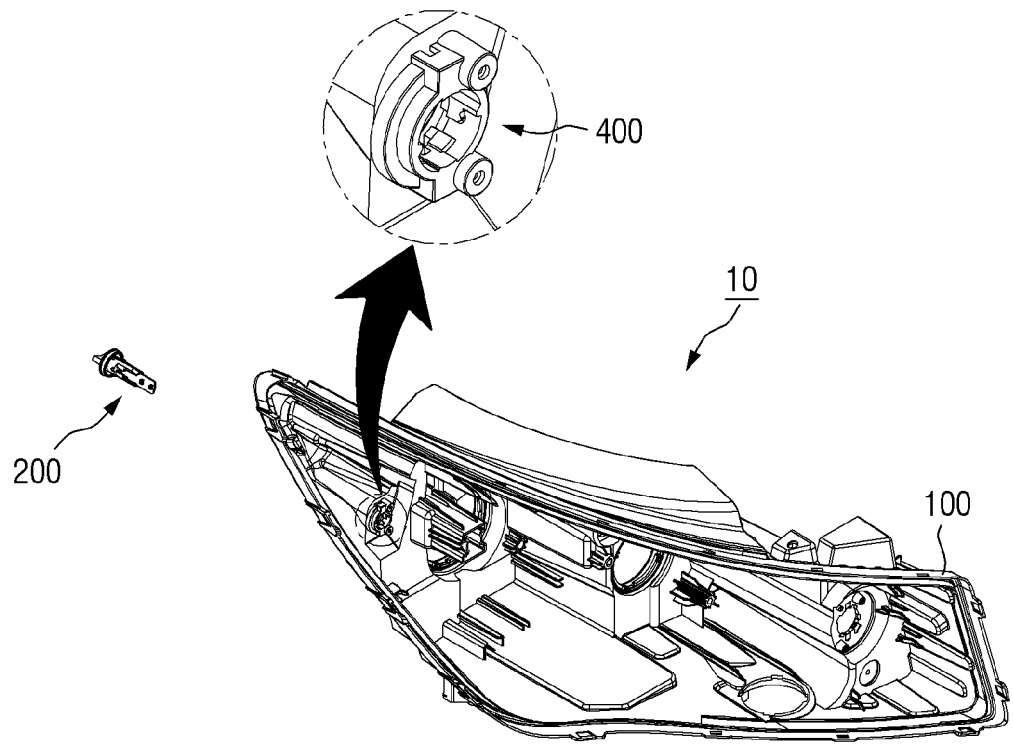
FIG. 3 is an exploded perspective view illustrating a state in which the side marker lamp has been separated from a lamp housing in FIG. 2.

FIG. 1 is a perspective view of a vehicular lamp according to some exemplary embodiments of the present disclosure, FIG. 2 is a perspective view illustrating a state in which an outer lens of a side marker lamp in FIG. 1 has been removed, and FIG. 3 is an exploded perspective view illustrating a state in which the side marker lamp has been separated from a lamp housing in FIG. 2.

Figure 4:
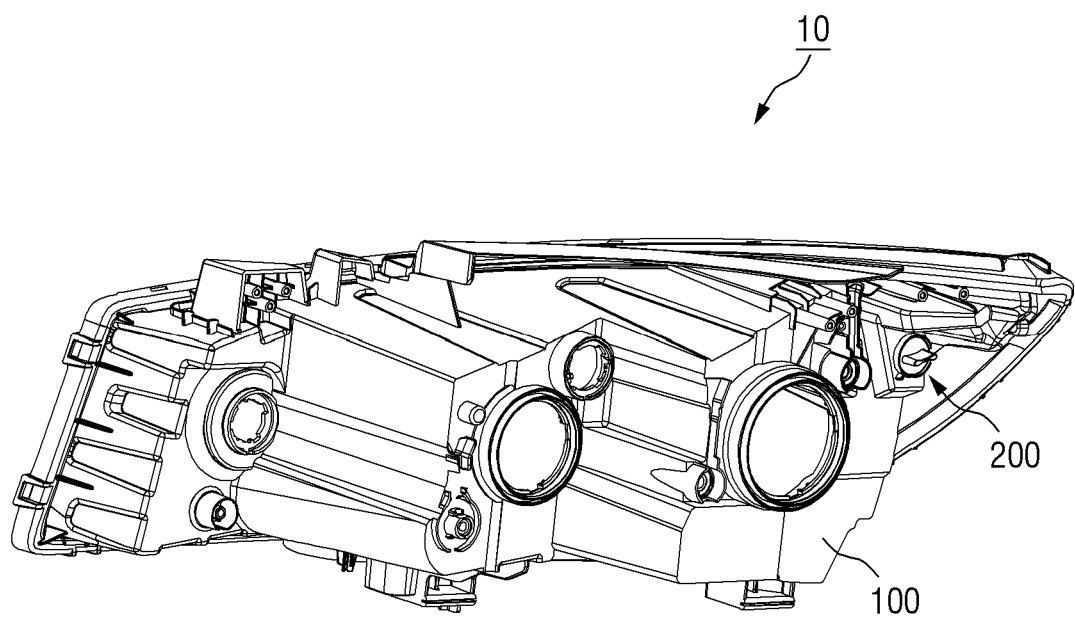
FIG. 4 is a rear perspective view illustrating the state shown in FIG. 2.
Figure 5:
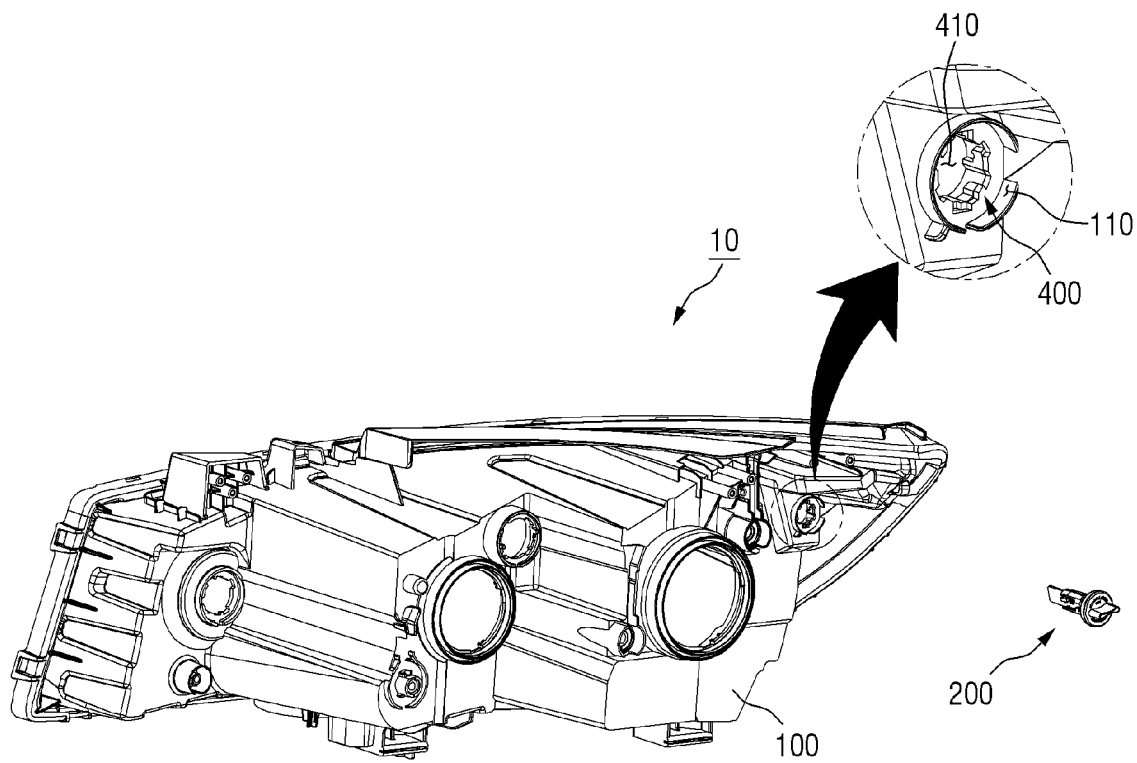
FIG. 5 is a perspective view illustrating a state in which the side marker lamp has been separated from the lamp housing in FIG. 4.

Also, FIG. 4 is a rear perspective view illustrating the state shown in FIG. 2, and FIG. 5 is a perspective view illustrating a state in which the side marker lamp has been separated from the lamp housing in FIG. 4.

As shown in FIGS. 1 to 5, a vehicular lamp 10, according to exemplary embodiments of the present disclosure, may include a lamp housing 100, a bracket 400 installed on an inner circumferential surface of a through hole 110 formed on one side of the lamp housing 100, a side marker lamp 200 detachably mounted in or separated from the bracket 400, and an outer lens 300 which transmits light emitted from the side marker lamp 200 to the outside.

Here, the side marker lamp 200 is inserted in the bracket 400 installed at the lamp housing 100 in one direction and is configured to be locked when rotated by a certain angle. Accordingly, mounting may be performed to prevent separation in an insertion direction, which will be described below in detail.

Figure 6:
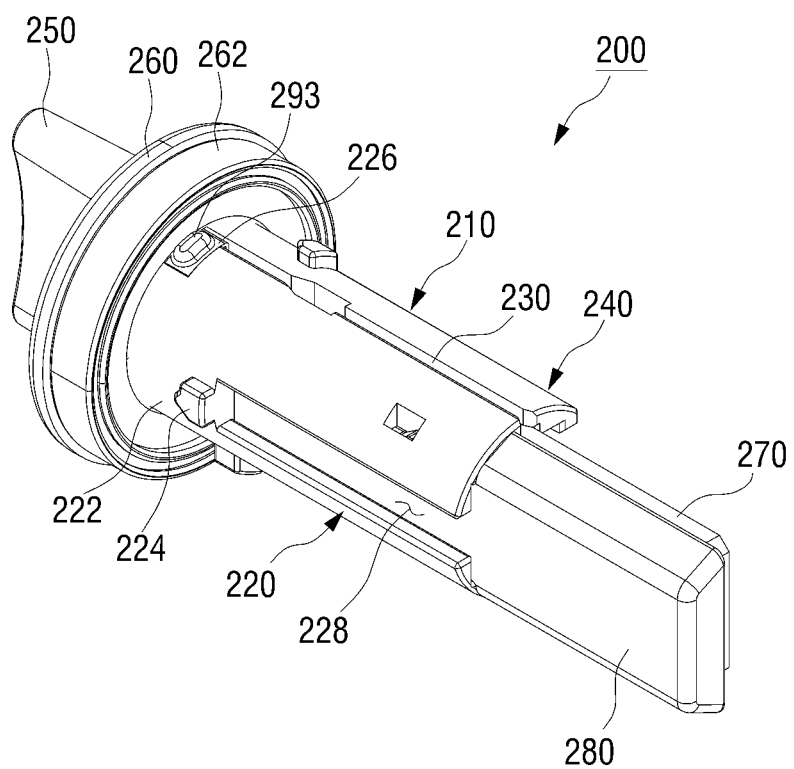
FIG. 6 is an overall perspective view of the side marker lamp of the vehicular lamp according to some exemplary embodiments of the present disclosure.
Figure 7:
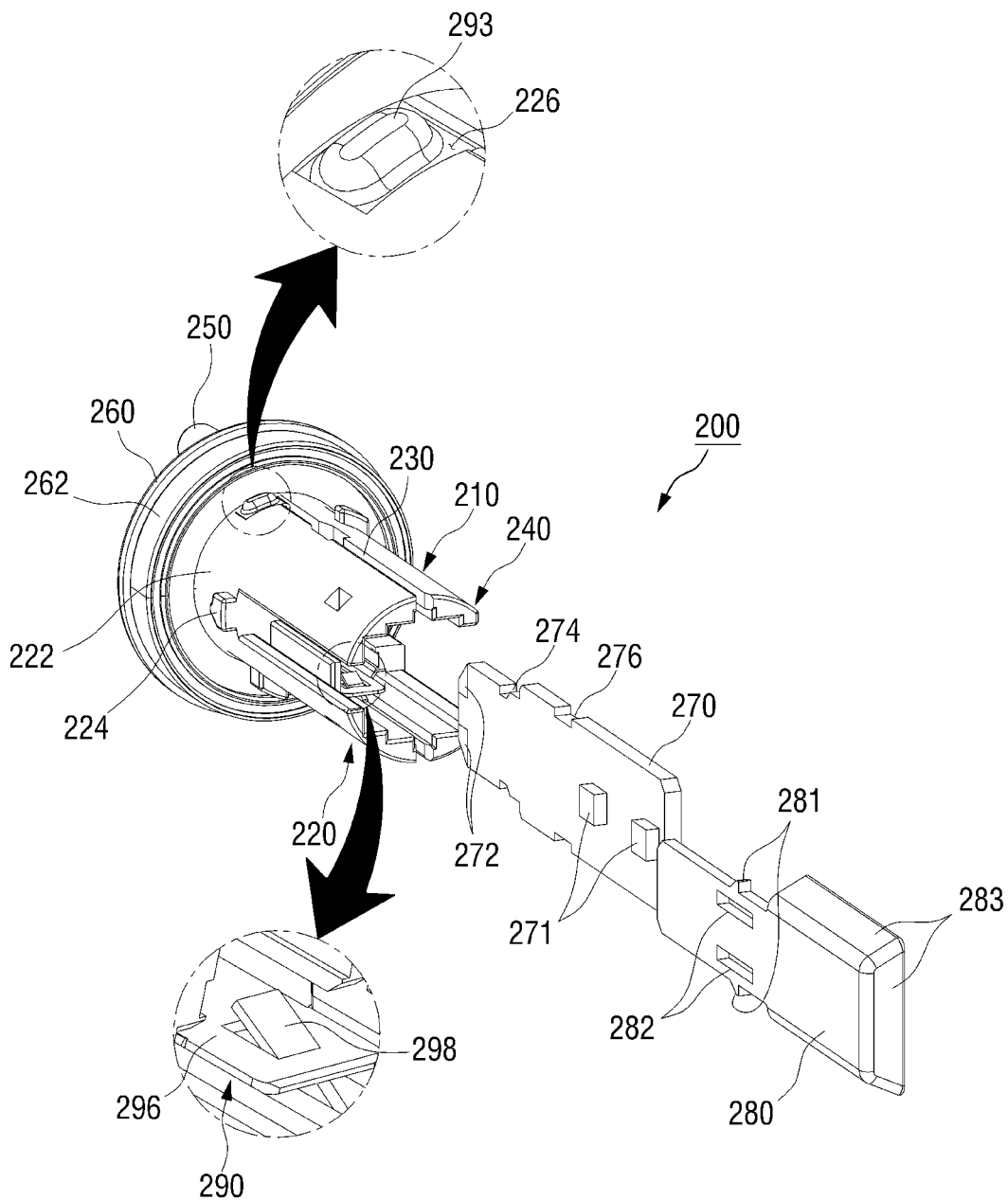
FIG. 7 is an exploded perspective view of the side marker lamp of FIG. 6.
Figure 8:
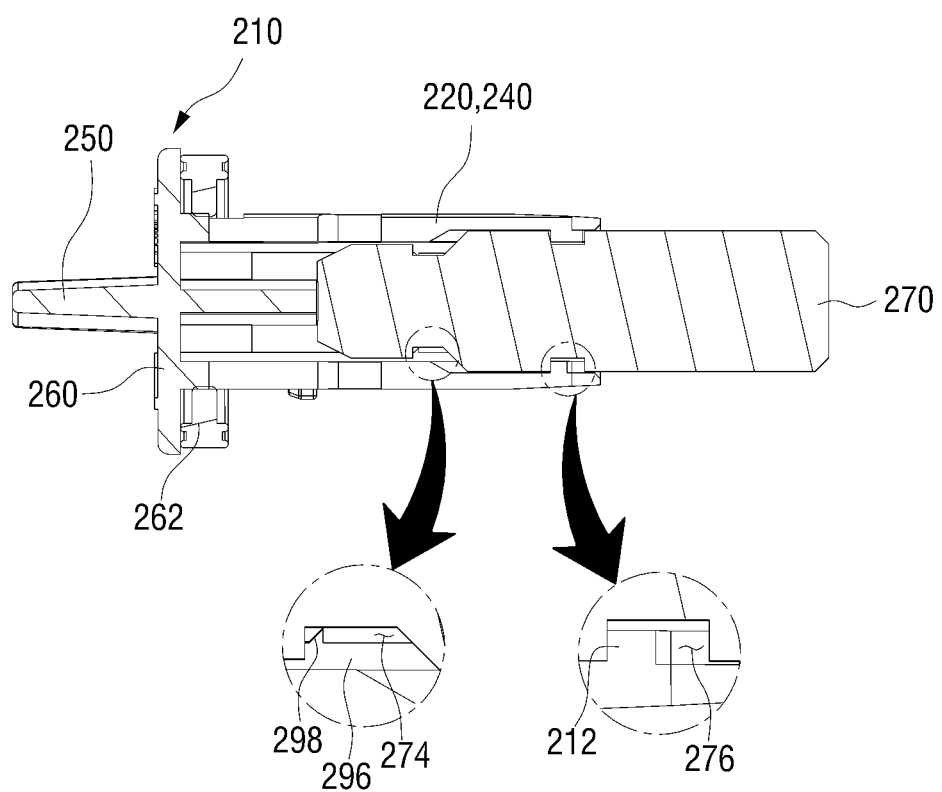
FIG. 8 is a cross-sectional view illustrating a coupling relationship between a guide portion and a substrate in FIG. 6.
Figure 9:
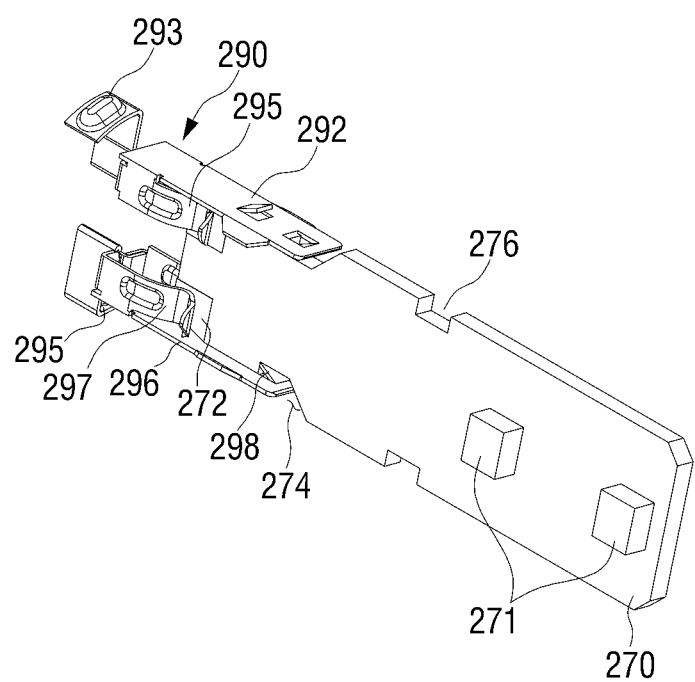
FIG. 9 is a partial perspective view illustrating a coupling relationship between a socket portion and the substrate.
Figure 10:
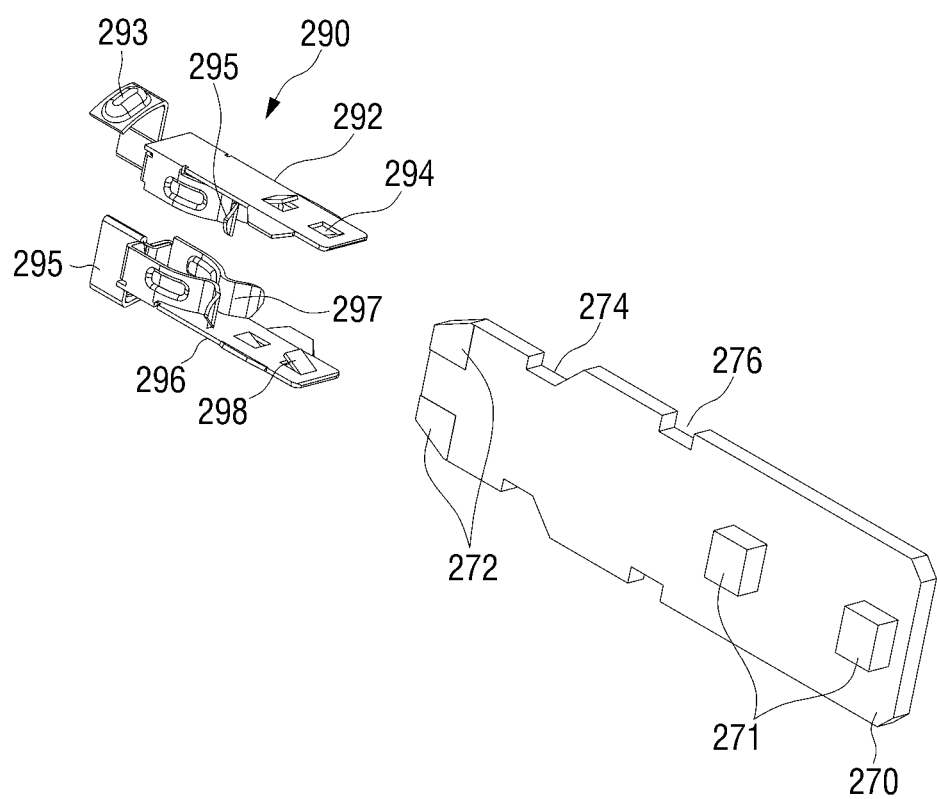
FIG. 10 is an exploded perspective view illustrating a state in which the socket portion and the substrate have been separated from each other.
Figure 11:
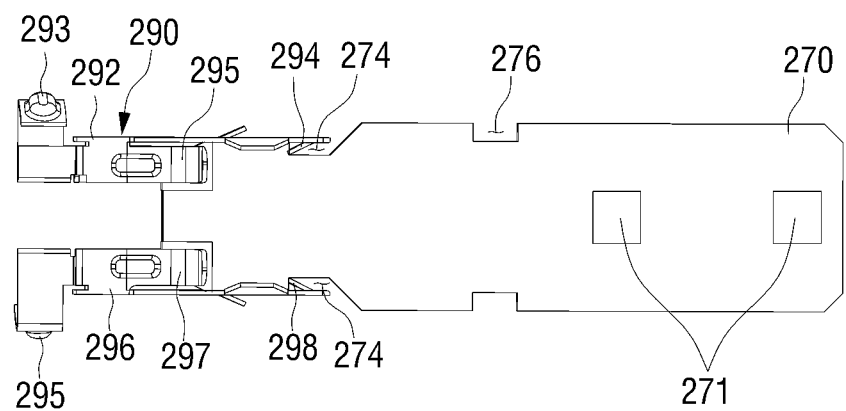
FIG. 11 is a front view illustrating the coupling relationship of FIG. 9.

FIG. 6 is an overall perspective view of the side marker lamp of the vehicular lamp according to some exemplary embodiments of the present disclosure, and FIG. 7 is an exploded perspective view of the side marker lamp of FIG. 6, Also, FIG. 8 is a cross-sectional view illustrating a coupling relationship between a guide portion and a substrate in FIG. 6, FIG. 9 is a partial perspective view illustrating a coupling relationship between a socket portion and the substrate, FIG. 10 is an exploded perspective view illustrating a state in which the socket portion and the substrate have been separated from each other, and FIG. 11 is a front view illustrating the coupling relationship of FIG. 9.

Figure 12:
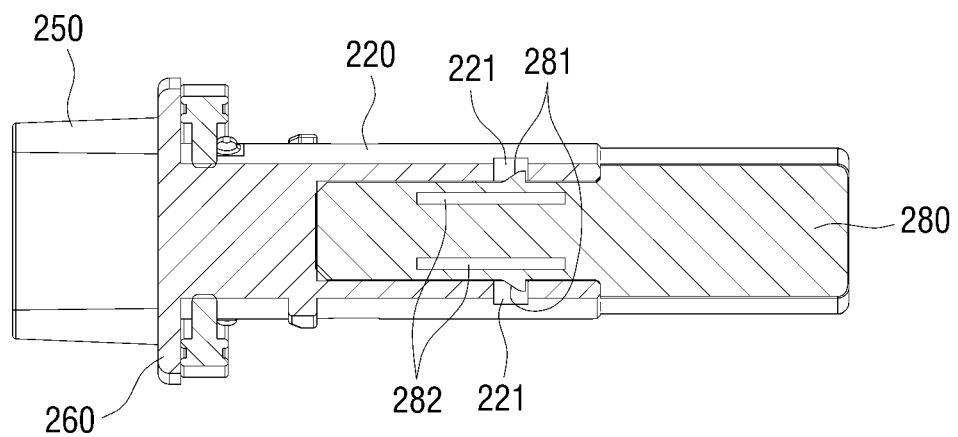
FIG. 12 is a cross-sectional view illustrating a coupling relationship between the guide portion and an optic lens in FIG. 6.
Figure 13:
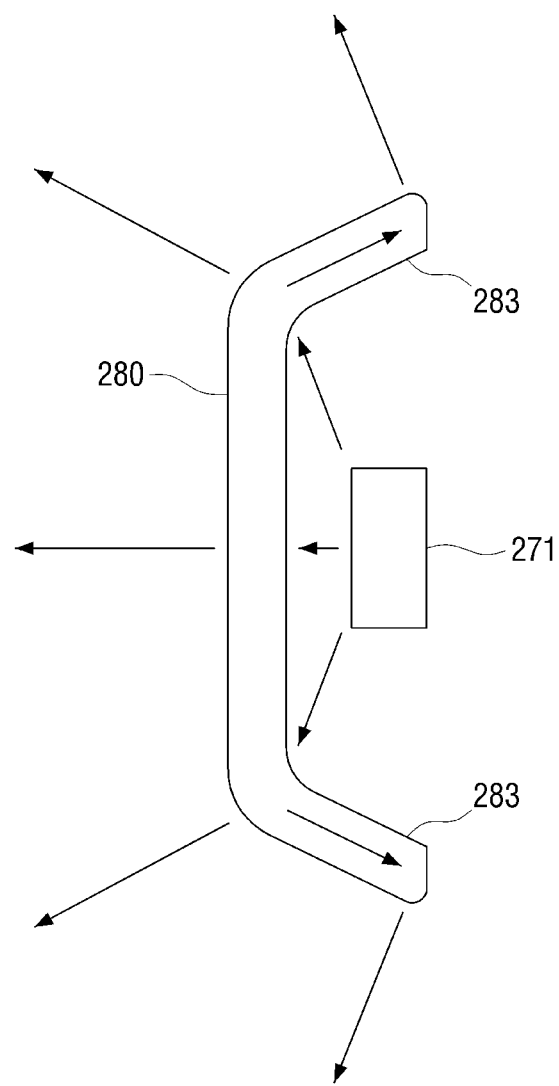
FIG. 13 is a cross-sectional view illustrating an arrangement of a light source and the optic lens in FIG. 6.

FIG. 12 is a cross-sectional view illustrating a coupling relationship between a light source and an optic lens in FIG. 6, and FIG. 13 is a cross-sectional view illustrating an arrangement of the guide portion and the optic lens in FIG. 6. Referring to FIGS. 6 to 13, the side marker lamp 200 provided at the vehicular lamp 10 according to exemplary embodiments of the present disclosure and relationships thereof will be described as follows.

As shown in the drawings, the side marker lamp 200 provided at the vehicular lamp 10 according to exemplary embodiments of the present disclosure may include a light source module which includes a light source 271 and a substrate 270, an optic lens 280, a guide portion 210, and a socket portion 290.

The light source 271 emits light based on an electrical signal. A light emitting diode (LED), which is a semiconductor device, may be applied thereto. However, the light source 271 is not limited thereto and may be a variety of light sources such as a laser diode (LD), a bulb-type lamp, and the like.

Here, an LED applied as the light source 271 of the vehicular lamp 10 according to the exemplary embodiments of the present disclosure will be described as an example.

A plurality of such light sources 271 may be provided to satisfy a necessary light amount, and an arrangement of the plurality of light sources 271 may be diversely varied.

Such light sources 271 may be arranged to be mounted on the substrate 270. In this case, the light source 271 may be arranged in a direction to which light is to be emitted, that is, from the front and rear of a vehicle toward the sides.

The substrate 270 is electrically connected to the light source 271 and may perform a function of supporting the light source 271. Also, the substrate 270 is formed of a plurality of circuits formed on a surface of a base material and may receive currents supplied from the outside and a signal related to whether a light source is to be turned on from a controller.

Accordingly, the substrate 270 may turn on or off the light source by inputting a turn-on or turn-off signal to the light source 271 through the plurality of circuits formed on the surface thereof.

As shown in FIGS. 6 and 7, the substrate 270 may have a panel shape with the light source 271 disposed on one surface thereof and may be slidably attached to or detached from the guide portion 210.

Here, when the substrate 270 is slidably attached to or detached from the guide portion 210, attachment and detachment may be performed using a hook-coupling method via a snap-fit. Accordingly, first holding grooves 274 and second holding grooves 276 in a concave groove shape for receiving held pieces 294 and 298 of the socket portion 290 and held protrusions 212 of the guide portion 210, which will be described below, may respectively be formed on one side and the other side of the substrate 270.

Also, a terminal 272 for providing electrical conduction by having a connection with the socket portion 290 may be formed on a front end of the substrate 270.

The optic lens 280 performs a function of diffusing light emitted from the light source 271. As the optic lens 280 diffuses light, the number of light sources 271 may be reduced and light emission efficiency may be improved. A knurling pattern may be formed on a surface of the optic lens 280 to scatter light. The pattern may be formed to be in a dot or line shape and may be formed in a variety of figures.

As shown in FIGS. 6 and 7, the optic lens 280 may have a panel shape, be disposed adjacent to the substrate 270, and be slidably attached to or detached from the guide portion 210.

Here, when the optic lens 280 is slidably attached to or detached from the guide portion 210, attachment and detachment may be performed using a hook-coupling method via a snap-fit. Accordingly, protrusions 281 for being held by holding grooves 221 of the guide portion 210, which will be described below, may be formed on one side and the other side of the optic lens 280.

A body of the optic lens 280 adjacent to the protrusions 281 may include through holes 282. For example, the through holes 282 may be formed to be long in a longitudinal direction of the optic lens 280. The through holes 282 may provide a function of allowing the protrusions 281 to elastically deform. Due to the through holes 282, the displacement of the protrusions 281 may be more flexible. That is, while approaching the holding grooves 221 of the guide portion 210, the protrusions 281 may be displaced toward the body and easily return to original positions when held by the holding grooves 221.

Also, with the through holes 282, it may become possible to easily couple and release the optic lens 280. A pressure may be applied to a side of the through hole 282 using an additional tool such that the engagement between the protrusion 281 and the holding groove 221 may be released and the optic lens 280 may be slidably released from the guide portion 210. The optic lens 280 may include light extenders 283 which are bent from edges and extend toward the substrate 270, that is, toward the light source module. The light extenders 283 may guide light emitted by the light source 271 so that the light is emitted across a broader range. As shown in FIG. 13, light emitted by the light source 271 may be transmitted along the light extenders 283 in the optic lens 280 and emitted from edges of the light extenders 283. Due to the light extenders 283, the light may be observed by observers distributed across a broader range.

The guide portion 210, as described above, is where the substrate 270 and the optic lens 280 are slidably inserted into for attachment or detachment and may be formed to be divided into a first guide 220 and a second guide 240 with a slit 230 therebetween to provide elasticity so as to open or close both ways when the substrate 270 and the optic lens 280 are slidably inserted.

Here, the held protrusions 212 may be formed at the first guide 220 and the second guide 240 to protrude to face each other with the slit 230 therebetween.

Accordingly, when the substrate 270 is inserted into the guide portion 210, the first guide 220 and the second guide 240 are slightly opened in both directions due to elasticity with respect to the slit 230. Here, when the second holding grooves 276 of the substrate 270 approach the held protrusions 212 of the first guide 220 and the second guide 240, the held protrusions 212 are closed again due to elasticity such that the held protrusions 212 may stay in the second holding grooves 276 of the substrate 270 to maintain a state in which the substrate 270 is coupled with the guide portion 210.

Likewise, when the optic lens 280 is inserted into the guide portion 210, the first guide 220 and the second guide 240 are slightly opened in both directions due to elasticity with respect to the slit 230. Here, when the protrusions 281 of the optic lens 280 approach the holding grooves 221 of the first guide 220, the protrusions 281 are opened again due to elasticity such that the protrusions 281 of the optic lens 280 may stay in the holding grooves 221 of the guide portion 210 to maintain a state in which the optic lens 280 is coupled with the guide portion 210.

Also, the guide portion 210 may include a body portion 222 to which the first guide 220 and the second guide 240 are connected as one body, with one or more fastening protrusions 224 formed to protrude at certain intervals on a circumferential surface thereof, and with through holes 226 formed in opposite directions to expose connection terminals 293 and 295 of the socket portion 290, which will be described below.

Also, the guide portion 210 may further include a handle 250 formed at a position opposite to the body portion 222 so as to be integrated as one body with a base plate 260 therebetween.

Accordingly, in a state in which the guide portion 210 is inserted into and coupled with the bracket 400 which will be described below, the base plate 260 performs a function of shielding an opening hole 410 of the bracket 400, and the body portion 222 and the handle 250 are disposed on different sides.

Here, a packing portion 262 is disposed on one side of the base plate 260 such that the opening hole 410 of the bracket 400 may be tightly sealed.

The guide portion 210 which includes the above-mentioned components, as described above, may be formed to be divided into the first guide 220 and the second guide 240 with the slit 230 therebetween and with opening holes 228 formed at each one surface to dissipate heat generated by the substrate 270 toward the outside and to transmit light emitted by the light source 271.

Meanwhile, the socket portion 290 may include a pair of a first socket 292 and second socket 296 arranged within the guide portion 210. Here, the connection terminal 293 of the first socket 292 and the connection terminal 295 of the second socket 296 may be exposed to exterior of the lamp through the through holes 226 formed at the body portion 222 of the guide portion 210.

The connection terminals 293 and 295 of the first socket 292 and the second socket 296 may be connected to one end of a wire (not shown) connected to a battery of a vehicle and may transmit an electrical signal to the socket portion 290 and also to the substrate 270 which is electrically connected to the socket portion 290.

That is, grip pieces 295 and 297, for gripping the terminals 272 located at the front end of the substrate 270 on both sides when the substrate 270 has been slidably inserted, are formed at the first socket 292 and the second socket 296. Accordingly, the grip pieces 295 and 297 of the socket portion 290 may grip and contact the terminals 272 of the substrate 270 on both sides such that electrical contact may be established therebetween.

Meanwhile, the first socket 292 and the second socket 296 which form the socket portion 290, as shown in FIGS. 9 and 10, may include extenders which extend in one direction and held pieces 294 and 298 formed to protrude inward to face each other from inner surfaces of ends of the extenders.

When the substrate 270 is slidably inserted into the guide portion 210, the held pieces 294 and 298 formed at the first socket 292 and the second socket 296 may be hook-coupled with the first holding grooves 274 of the substrate 270 by snap-fits.

That is, since the socket portion 290 is disposed inside the guide portion 210, when the substrate 270 has been slidably inserted into the guide portion 210, the first holding grooves 274 arranged at the front end of the substrate 270 may be snap-fit-coupled with the held pieces 294 and 298 of the first socket 292 and the second socket 296, and the second holding grooves 276 arranged at a rear end of the substrate 270 are snap-fit-coupled with the held protrusions 212 formed at the guide portion 210 so as to maintain a state in which the substrate 270 is coupled with the guide portion 210.

Also, the terminals 272 located at the front end of the substrate 270, as described above, may be gripped by the grip pieces 295 and 297 of the socket portion 290 and come into contact therewith so as to conduct electricity such that the substrate 270 may be coupled to the guide portion 210 and the socket portion 290 in three stages.

Here, since the first guide 220 and the second guide 240 which form the guide portion 210 are arranged in both sides with the slit 230 therebetween, when the substrate 270 or the optic lens 280 is slidably inserted into the guide portion 210, the first guide 220 and the second guide 240 yield elasticity from the slit 230 to open in both directions such that the substrate 270 or the optic lens 280 may be easily inserted into the guide portion 210.

As described above, when the substrate 270 and the optic lens 280 are slidably inserted into the guide portion 210 and the socket portion 290 disposed within the guide portion 210 are snap-fit-coupled in three stages, the light source 271 mounted on one surface of the substrate 270 may be disposed in a direction facing the outer lens 300 through the opening hole 228 of the first guide 220 or the second guide 240.

Accordingly, when the light source 271 is turned on and emits light, the emitted light passes through the optic lens 280 and passes through the outer lens 300 through the opening holes 228 of the guide portion 210 to be emitted toward the outside such that visibility may be provided to drivers of other vehicles or pedestrians at night.

Since the optic lens 280 is disposed between the light source 271 and the outer lens 300, the light emitted by the light source 271 is diffused such that light emission efficiency may be increased and the number of light sources may be reduced.

Figure 14:
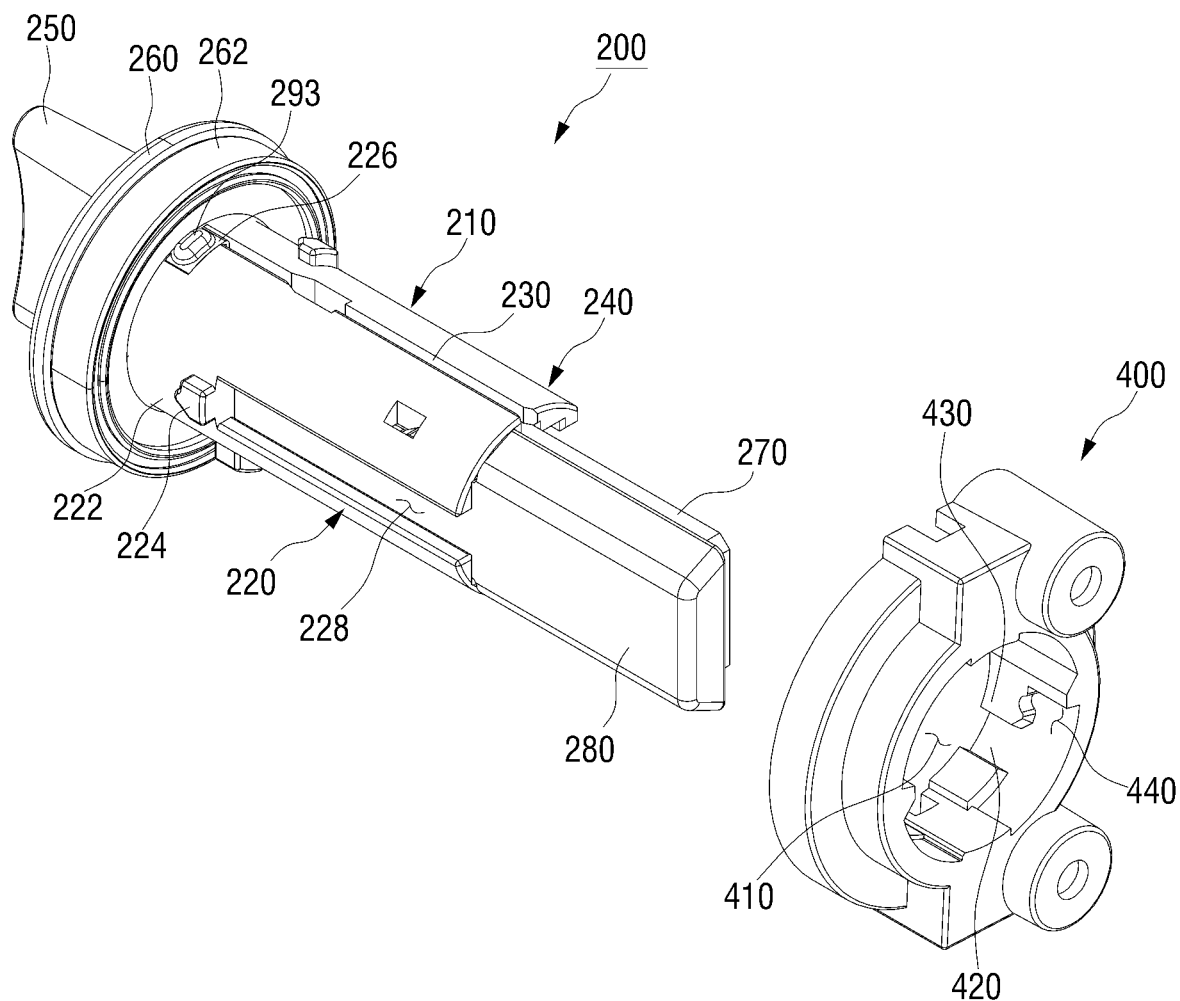
FIG. 14 is an exploded perspective view illustrating a relationship between the side marker lamp and a bracket installed at the lamp housing, which are coupled with each other, in the vehicular lamp according to some exemplary embodiments of the present disclosure.
Figure 15:
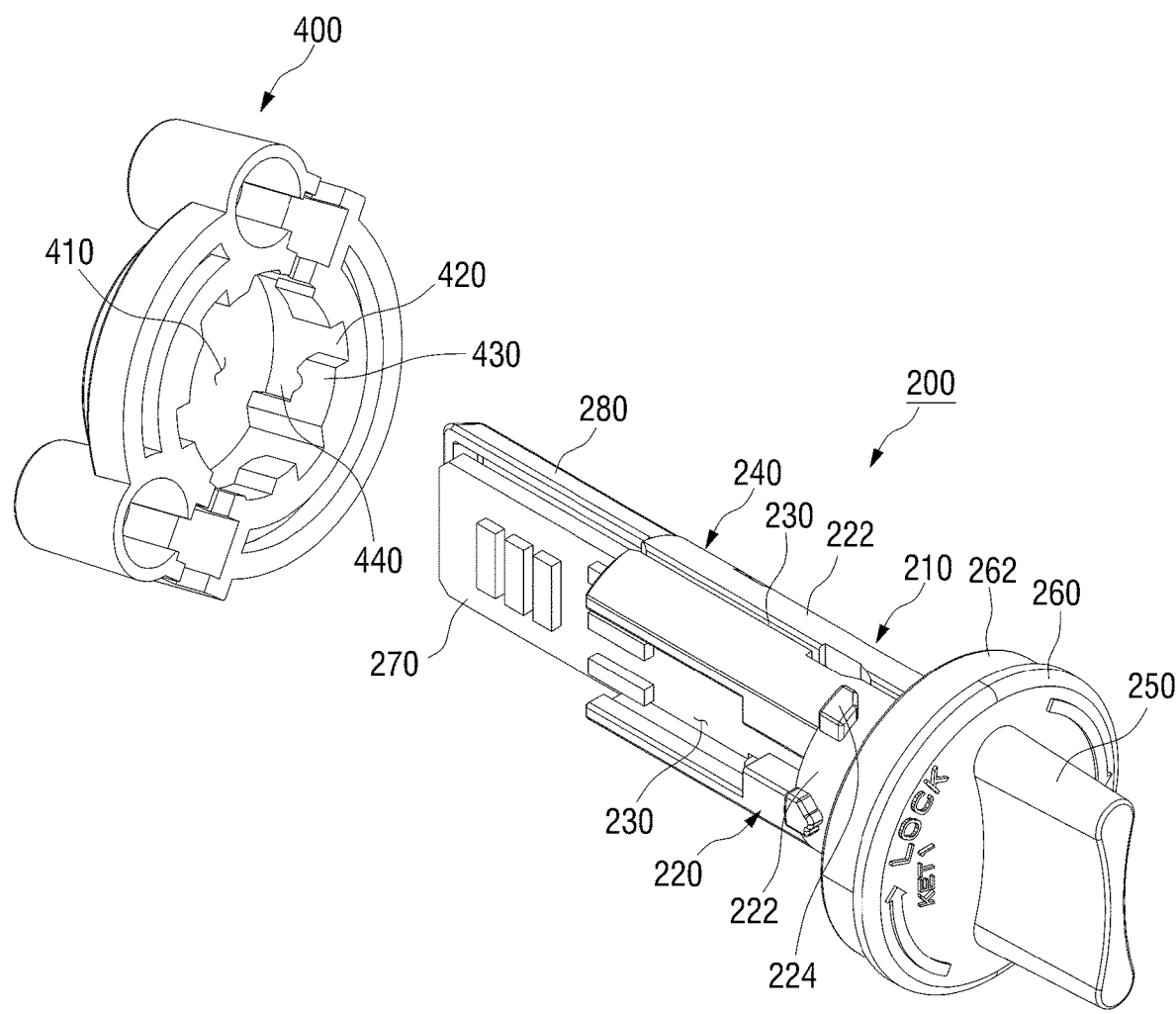
FIG. 15 is an exploded rear perspective view illustrating the relationship shown in FIG. 14.

FIG. 14 is an exploded perspective view illustrating a relationship between the side marker lamp and the bracket installed at the lamp housing, which are coupled with each other, in the vehicular lamp according to some exemplary embodiments of the present disclosure. FIG. 15 is an exploded rear perspective view illustrating the relationship shown in FIG. 14, and FIG. 16 is a front view illustrating the handle of the side marker lamp of the vehicular lamp according to some exemplary embodiments of the present disclosure.

Figure 16:
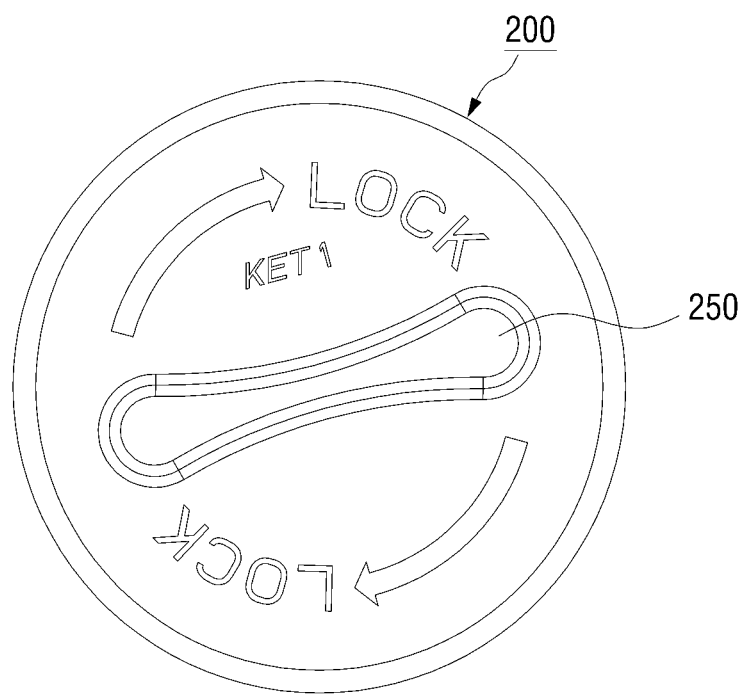
FIG. 16 is a front view illustrating a handle of the side marker lamp of the vehicular lamp according to some exemplary embodiments of the present disclosure.

Referring to FIGS. 14 to 16, a process of attaching and detaching the side marker lamp 200 assembled in the above-described configuration to the lamp housing 100, will be described as follows.

As described above, the through hole 110 is formed in one side of the lamp housing 100, the bracket 400 is installed in the through hole 110, and the side marker lamp 200 may be detachably installed in the bracket 400.

The bracket 400 is formed in a ring shape with the opening hole 410 at a center thereof such that the light source module and the guide portion 210 of the side marker lamp 200 may be inserted through the opening hole 410.

Here, lead grooves 420 corresponding to the fastening protrusions 224 formed on the circumferential surface of the body portion 222 of the side marker lamp 200 may be formed at an inner circumferential surface of the bracket 400, and restriction pieces 430 may be formed near the lead grooves 420. Here, accommodation grooves 440 for accommodating the fastening protrusions 224 of the body portion 222 may be formed inside the restriction pieces 430.

Accordingly, as shown in FIGS. 14 and 15, when a worker inserts the light source module and the guide portion 210 through the opening hole 410 of the bracket 400 while gripping the handle 250 of the side marker lamp 200, the fastening protrusions 224 formed on the circumferential surface of the body portion 222 of the guide portion 210 may be pushed in as being aligned with the lead grooves 420 of the bracket 400. Afterward, as shown in FIG. 16, when the handle 250 is rotated in one direction, the fastening protrusions 224 of the body portion 222 may move toward the accommodation grooves 440 inside the restriction pieces 430. Here, the fastening protrusions 224 of the body portion 222 may be held by the restriction pieces 430 so that a separation is prevented in an insertion direction and a fastened state is maintained.

On the other hand, to separate the side marker lamp 200 while the side marker lamp 200 is fastened to the bracket 400, the handle 250 is rotated in a direction opposite the above-described direction in order to align the fastening protrusions 224 of the body portion 222 with the lead grooves 420 of the bracket 400 and is then pulled in a direction opposite to the insertion direction such that separation may be achieved.

As described above, the side marker lamp 200 is attached to and detached from the bracket 400 installed in the through hole 110 of the lamp housing 100 by a simple rotating operation, such effects as easy replacement thereof as well as interchangeable use with conventional bulb type side marker lamps may be obtained.

Also, in the case of the side marker lamp 200 applied to the vehicular lamp 10 according to exemplary embodiments of the present disclosure, since the substrate 270 on which the light source 271 is disposed is simply slidably attached to and detached from the guide portion 210, the light source module which includes the light source 271 and the substrate 270 may be easily replaced.

It should be understood by one of ordinary skill in the art that the present disclosure can be modified in other detailed forms without changing the technical concept and essential features of the present disclosure. Therefore, the above-described embodiments should be understood to be exemplary and not to be limitative in every aspect. The scope of the present disclosure will be defined by the following claims rather than the above detailed description, and all changes and modifications derived from the meaning and the scope of the claims and equivalents thereof should be understood as being included in the scope of the present disclosure.

DESCRIPTION OF REFERENCE NUMERAL

| | |
|---|---|
| 10: Vehicular lamp | 100: Lamp housing |
| 200: Side marker lamp | 210: Guide portion |
| 212: Held protrusion | 220: First guide |
| 221: Holding grooves | 222: Body portion |
| 224: Fastening protrusion | 226: Through hole |
| 228: Opening hole | 230: Slit |
| 240: Second guide | 250: Handle |
| 260: Base plate | 270: Substrate |
| 272: Terminal | 274: First holding groove |
| 276: Second holding groove | 271: LED light source |
| 280: Optic lens | 281: Protrusion |
| 282: Through hole | 283: Light extender |
| 290: Socket portion | 292: First socket |
| 293: Connection terminal | 294: Held piece |
| 295: Grip piece | 295: Connection terminal |

-continued

DESCRIPTION OF REFERENCE NUMERAL

| | |
|---|---|
| 296: Second socket | 297: Grip piece |
| 298: Held piece | 300: Outer lens |
| 400: Bracket | 410: Opening hole |
| 420: Lead groove | 430: Restriction piece |
| 440: Accommodation groove | |

The invention claimed is:

1. A vehicular lamp comprising:
a lamp housing;
a bracket installed on one side of the lamp housing; and
a lamp attachable to and detachable from the bracket so as to be capable of being fastened,
wherein the lamp comprises:
   a light source module;
   a guide portion to which the light source module is slidably coupled; and
   a socket portion installed within the guide portion and to which the light source module is slidably coupled to allow electrical conduction,
wherein the light source module comprises:
   a substrate on which a circuit is printed; and
   one or more light emitting diode (LED) light sources arranged on at least one surface of the substrate,
wherein terminals, which come into contact with and are gripped by the socket portion, are formed on one end of the substrate, and
wherein a first holding groove snap-fit-coupled to the socket portion and a second holding groove snap-fit-coupled to the guide portion are formed on at least one of both sides of the substrate.

2. The vehicular lamp of claim 1, wherein the guide portion comprises:
a first guide and a second guide arranged on both sides with a slit therebetween; and
a body portion connected to the first guide and the second guide as one body, wherein one or more held protrusions are formed on the first guide and the second guide to protrude to face each other with the slit therebetween and to be snap-fit-coupled to the second holding grooves of the substrate.

3. The vehicular lamp of claim 2, wherein the socket portion comprises:
grip pieces which grip the terminals of the substrate and provide a conduction function;
connection terminals to which one end of a wire connected to a vehicular battery is connected; and
first and second sockets at each of which a held piece is formed for being snap-fit-coupled to the first holding groove of the substrate.

4. The vehicular lamp of claim 3, wherein through holes are formed at a circumferential surface of the body portion to expose the connection terminals of the socket portion to exterior.

5. The vehicular lamp of claim 2, wherein an opening hole through which light emitted by the LED light source passes, is formed at one surface of at least one of the first guide and the second guide, and
a lens for diffusing the light emitted by the LED light source is disposed in the opening hole.

6. The vehicular lamp of claim 2, wherein one or more fastening protrusions are formed on a circumferential surface of the body portion, and wherein an inner circumferential surface of the bracket comprises:

lead grooves for leading the fastening protrusions;

accommodation grooves for accommodating the fastening protrusions when the fastening protrusions are rotated; and restriction pieces for restricting the fastening protrusions from being separated in an insertion direction while the fastening protrusions are accommodated in the accommodation grooves.

7. The vehicular lamp of claim 1, further comprising an optic lens which diffuses the light of the light source module and is slidably coupled to the guide portion.

8. The vehicular lamp of claim 7, wherein the optic lens comprises:

protrusions held by and coupled to the holding grooves of the guide portion; and through holes for allowing elastic displacement of the protrusions.

9. The vehicular lamp of claim 7, wherein the optic lens includes light extenders which are bent from and extend from edges of the optic lens toward the light source module and guide the light of the light source module so that the light is emitted across an extended range.

10. The vehicular lamp according to any one of the preceding claims, further comprising an outer lens for allowing light emitted by the light source module to be transmitted outward.

\* \* \* \* \*